US012752287B2

(12) United States Patent
Kim

(10) Patent No.: US 12,752,287 B2
(45) Date of Patent: Oct. 6, 2026

(54) INJECTION NOZZLE

(71) Applicant: SAMSUNG SDI CO., LTD., Yongin-si (KR)

(72) Inventor: Gangyul Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 267 days.

(21) Appl. No.: 18/380,796

(22) Filed: Oct. 17, 2023

(65) Prior Publication Data

US 2024/0286148 A1 Aug. 29, 2024

(30) Foreign Application Priority Data

Feb. 28, 2023 (KR) ........................ 10-2023-0026760

(51) Int. Cl.

| | |
|---|---|
| ***B05B 1/14*** | (2006.01) |
| ***B05B 1/20*** | (2006.01) |
| ***B05B 15/658*** | (2018.01) |
| ***H01M 10/653*** | (2014.01) |

(52) U.S. Cl.

CPC .................. *B05B 1/14* (2013.01); *B05B 1/20* (2013.01); *B05B 15/658* (2018.02); *H01M 10/653* (2015.04)

(58) Field of Classification Search

CPC ........... B05B 1/14; B05B 15/658; B05B 1/20; H01M 10/653

USPC ....... 239/536, 548, 589, 550, 566, 525, 530, 239/532, 754

See application file for complete search history.

(56) References Cited

U.S. PATENT DOCUMENTS

| | | | | |
|---|---|---|---|---|
| 5,027,455 A * | 7/1991 | Commisso | A47G 9/062 | 239/289 |
| 5,273,214 A * | 12/1993 | Huffstutler | B05B 15/628 | 239/279 |
| 6,015,099 A | 1/2000 | Ducey | | |
| 7,114,667 B1 * | 10/2006 | Bontems | F16L 13/0209 | 239/266 |
| 7,137,269 B1 | 11/2006 | Maranville | | |
| 10,427,651 B2 | 10/2019 | Goff et al. | | |
| 2021/0313636 A1 | 10/2021 | Marpu et al. | | |

FOREIGN PATENT DOCUMENTS

| | | |
|---|---|---|
| KR | 10-1389733 B1 | 4/2014 |
| KR | 10-2021-0094376 A | 7/2021 |

OTHER PUBLICATIONS

European Search Report dated May 3, 2024.

* cited by examiner

*Primary Examiner* — Steven J Ganey
(74) *Attorney, Agent, or Firm* — Lee IP Law, P.C.

(57) ABSTRACT

An injection nozzle configured to spray a thermal interface material to a surface of a rechargeable battery housing, the injection nozzle includes a main nozzle that is configured to receive the thermal interface material from a source and spray the thermal interface material to the surface of the rechargeable battery housing; and a plurality of sub nozzles that are coupled to the main nozzle in a lateral direction, the plurality of sub nozzles being configured receive the thermal interface material from the main nozzle and spray the thermal interface material to the surface of the rechargeable battery housing.

18 Claims, 5 Drawing Sheets

INJECTION NOZZLE

CROSS-REFERENCE TO RELATED APPLICATION

This application claims priority to and the benefit of Korean Patent Application No. 10-2023-0026760 filed in the Korean Intellectual Property Office on Feb. 28, 2023, the entire contents of which are incorporated herein by reference.

BACKGROUND

1. Field

Embodiments relate to an injection nozzle.

2. Description of the Related Art

A rechargeable battery is a battery that repeatedly performs charging and discharging. Some rechargeable batteries may be formed of a unit cell, a module, a pack, and the like, including a rechargeable battery housing that accommodates an electrode assembly.

SUMMARY

The embodiments may be realized by providing an injection nozzle configured to spray a thermal interface material to a surface of a rechargeable battery housing, the injection nozzle including a main nozzle that is configured to receive the thermal interface material from a source and spray the thermal interface material to the surface of the rechargeable battery housing; and a plurality of sub nozzles that are coupled to the main nozzle in a lateral direction, the plurality of sub nozzles being configured to receive the thermal interface material from the main nozzle and spray the thermal interface material to the surface of the rechargeable battery housing.

A number of the plurality of sub nozzles may correspond to a width of the surface of the rechargeable battery housing along the lateral direction.

The main nozzle may include an inflow hole that is configured to receive the thermal interface material from the source; an injection hole that is configured to spray the thermal interface material supplied through the inflow hole to the surface of the rechargeable battery housing; and a main nozzle body that is in fluid communication with and between the inflow hole and the injection hole.

A width of an inner space of the main nozzle in the lateral direction may be reduced from the inflow hole through the main nozzle body to the injection hole.

The main nozzle may further include a first main coupling portion protruding in the lateral direction from a first portion of the main nozzle body and coupled with an adjacent first sub nozzle of the plurality of sub nozzles; and a second main coupling portion protruding in the lateral direction from a second portion of the main nozzle body on an opposite side of the first portion in the lateral direction and coupled with an adjacent second sub nozzle of the plurality of sub nozzles.

The first sub nozzle may include a first sub coupling portion that is coupled with the first main coupling portion and is configured to receive the thermal interface material from the main nozzle body; a first sub injection hole that is configured to spray the thermal interface material received from the first sub coupling portion to the surface of the rechargeable battery housing; and a first sub nozzle body that is in fluid communication with and between the first sub coupling portion and the first sub injection hole.

The first main coupling portion may be inserted into the first sub coupling portion.

The first main coupling portion may be screw-coupled with the first sub coupling portion.

The first sub nozzle may further include a first extension coupling portion that protrudes in the lateral direction from a portion of the first sub nozzle body on an opposite side of the first sub coupling portion in the lateral direction and is coupled with an adjacent third sub nozzle of the plurality of sub nozzles.

The third sub nozzle may include a third sub coupling portion that is coupled with the first extension coupling portion and is configured to receive the thermal interface material from the first sub nozzle body; a third sub injection hole that is configured to spray the thermal interface material received from the third sub coupling portion to the surface of the rechargeable battery housing; and a third sub nozzle body that is in fluid communication with and between the third sub coupling portion and the third sub injection hole.

The first extension coupling portion may be inserted into the third sub coupling portion.

The first extension coupling portion may be screw-coupled with the third sub coupling portion.

The third sub nozzle may further include a third extension coupling portion that protrudes in the lateral direction from a portion of the third sub nozzle body on the opposite side of the third sub coupling portion in the lateral direction, and the injection nozzle may further include a first nozzle cap coupled to the third extension coupling portion.

The second sub nozzle may include a second sub coupling portion that is coupled with the second main coupling portion and is configured to receive the thermal interface material from the main nozzle body; a second sub injection hole configured to spray the thermal interface material received from the second sub coupling portion to the surface of the rechargeable battery housing; and a second sub nozzle body that is in fluid communication with and between the second sub coupling portion and the second sub injection hole.

The second main coupling portion may be inserted into the second sub coupling portion.

The second main coupling portion may be screw-coupled with the second sub coupling portion.

The second sub nozzle may further include a second extension coupling portion that protrudes in the lateral direction from a portion of the second sub nozzle body on an opposite side of the second sub coupling portion in the lateral direction and is coupled with an adjacent fourth sub nozzle of the plurality of sub nozzles.

The fourth sub nozzle may include a fourth sub coupling portion that is coupled to the second extension coupling portion and is configured to receive the thermal interface material from the second sub nozzle body; a fourth sub injection hole that is configured to spray the thermal interface material received from the fourth sub coupling portion to the surface of the rechargeable battery housing; and a fourth sub nozzle body that is in fluid communication with and between the fourth sub coupling portion and the fourth sub injection hole.

The second extension coupling portion may be inserted into the fourth sub coupling portion, and the second extension coupling portion may be screw-coupled with the fourth sub coupling portion.

The fourth sub nozzle may further include a fourth extension coupling portion that protrudes in the lateral direction from a portion of the fourth sub nozzle body on the opposite side of the fourth sub coupling portion in the lateral direction, and the injection nozzle may further include a second nozzle cap coupled with the fourth extension coupling portion.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
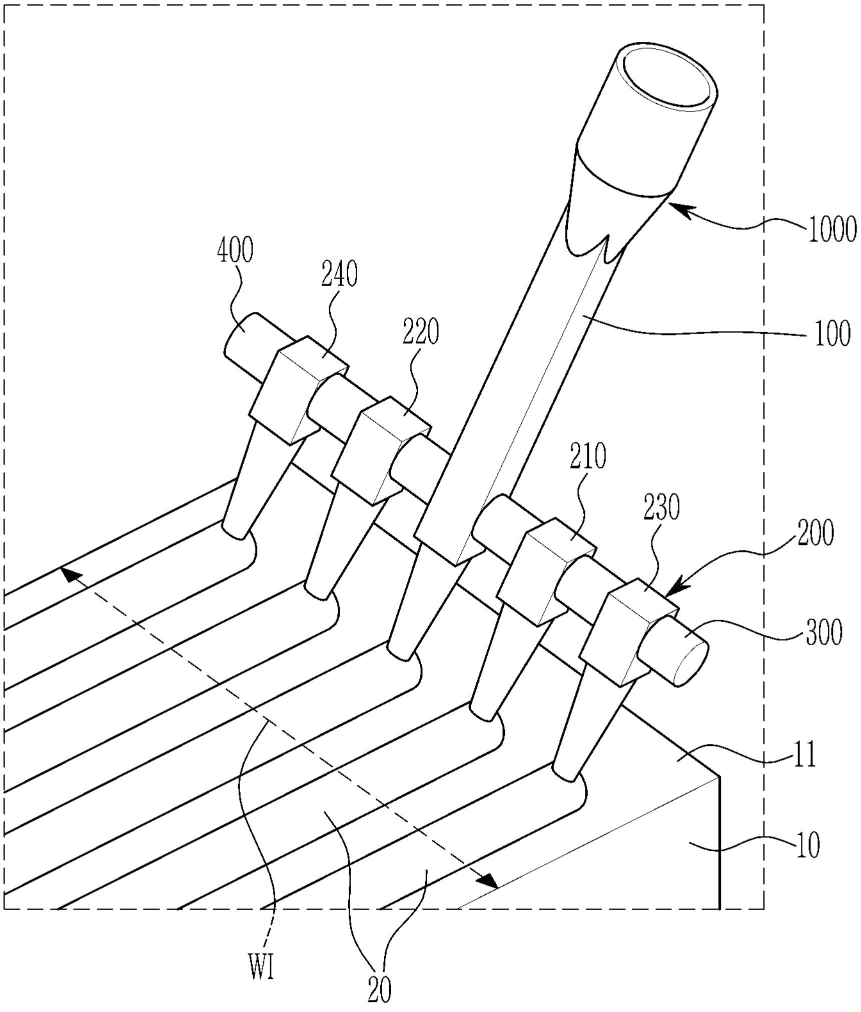
FIG. 1 is a perspective view of an injection nozzle that injects a thermal interface material on a surface of a rechargeable battery housing according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout. As used herein, the terms "first," "second," and the like are merely for identification and differentiation, and are not intended to imply or require sequential inclusion (e.g., a third element and a fourth element may be described without implying or requiring the presence of a first element or second element). As used herein, the term "or" is not an exclusive term, e.g., "A or B" would include A, B, or A and B.

Unless explicitly described to the contrary, the word "comprise", and variations such as "comprises", "comprising", "includes," or "including" will be understood to imply the inclusion of stated elements but not the exclusion of any other elements.

Hereinafter, referring to FIG. 1 to FIG. 5, an injection nozzle according to an embodiment will be described.

FIG. 1 is a perspective view of an injection nozzle that is configured to inject a thermal interface material on a surface of a rechargeable battery housing according to an embodiment.

Referring to FIG. 1, the injection nozzle 1000 according to an embodiment may inject a thermal interface material (TIM) on a surface 11 of a rechargeable battery housing 10 that forms a unit cell, a module, or a pack.

A thermal interface material 20 sprayed onto a surface 11 of the rechargeable battery housing 10 by the injection nozzle 1000 according to an embodiment may include, e.g., silicon, urethane, acryl, or the like.

The injection nozzle 1000 according to an embodiment may include a main nozzle 100 configured to inject the thermal interface material 20 onto the surface 11 of the rechargeable battery housing 10 by receiving the thermal interface material 20 from the outside (e.g., from a thermal interface material supply or source), and a plurality of sub nozzles 200 coupled in a horizontal or lateral direction to the main nozzle 100, configured to receive the thermal interface material 20, and configured to inject the thermal interface material 20 onto the surface 11 of the rechargeable battery housing 10. In an implementation, the main nozzle 100 may be connected to a nozzle mover, e.g., an external pipe or a robot arm. The plurality of sub nozzles 200 may be coupled to the main nozzle 100 in a number corresponding to a width WI of the surface 11 of the rechargeable battery housing 10 along the horizontal direction (e.g., in a number such that a width of the injection nozzle 1000 in the lateral direction may be about the same as the width of the rechargeable battery housing 10 in the lateral direction), and may be configured to spray the thermal interface material 20 onto the surface 11 of the rechargeable battery housing 10 together with the main nozzle 100. The plurality of sub nozzles 200 are coupled to the main nozzle 100 in a number corresponding to the width WI of the surface 11 of the rechargeable battery housing 10, the main nozzle 100 and the plurality of sub nozzles 200 may simultaneously spray thermal interface material 20 to the surface 11 of the rechargeable battery housing 10, and the process time and process cost of spraying the thermal interface material 20 on the surface 11 of the rechargeable battery housing 10 may be minimized. In an implementation, the injection nozzle 1000 that easily injects the thermal interface material 20 corresponding to the width WI of the surface 11 of the various rechargeable battery housings 10 having various surface areas may be provided.

The injection nozzle 1000 according to an embodiment may include the main nozzle 100, the plurality of sub nozzles 200 (including, e.g., a first sub nozzle 210, a second sub nozzle 220, a third sub nozzle 230, and a fourth sub nozzle 240), a first nozzle cap 300, and a third nozzle cap 400.

Figure 2:
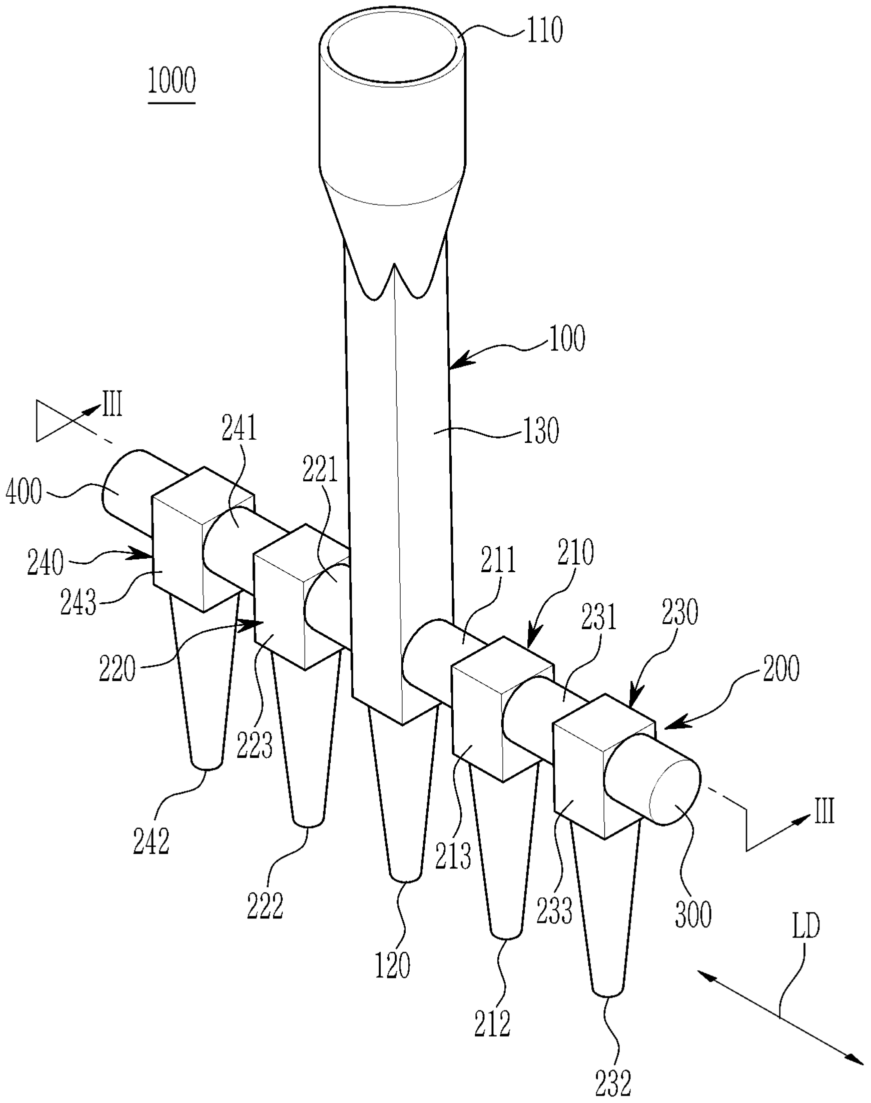
FIG. 2 is a perspective view of the injection nozzle according to an embodiment.
Figure 3:
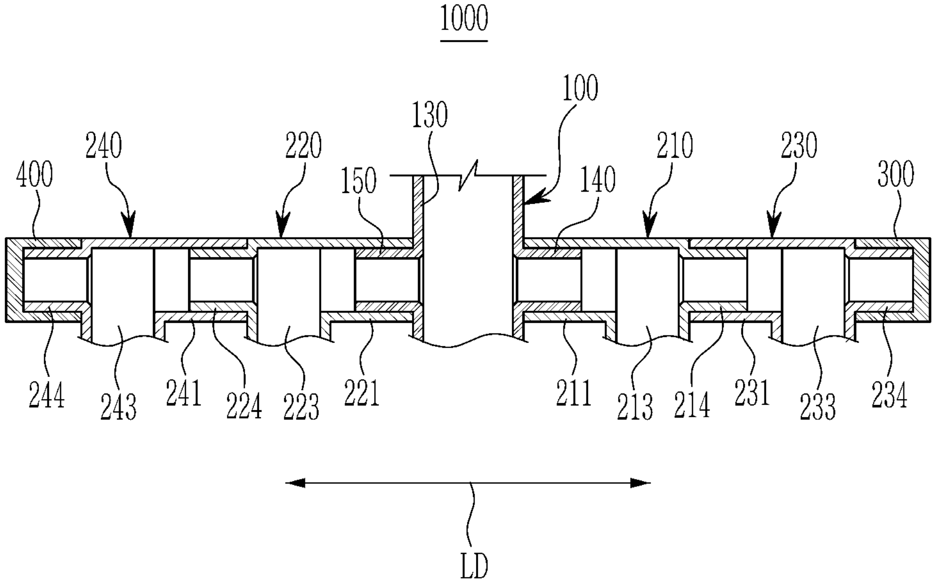
FIG. 3 is a cross-sectional view along III-III of FIG. 2.
Figure 4:
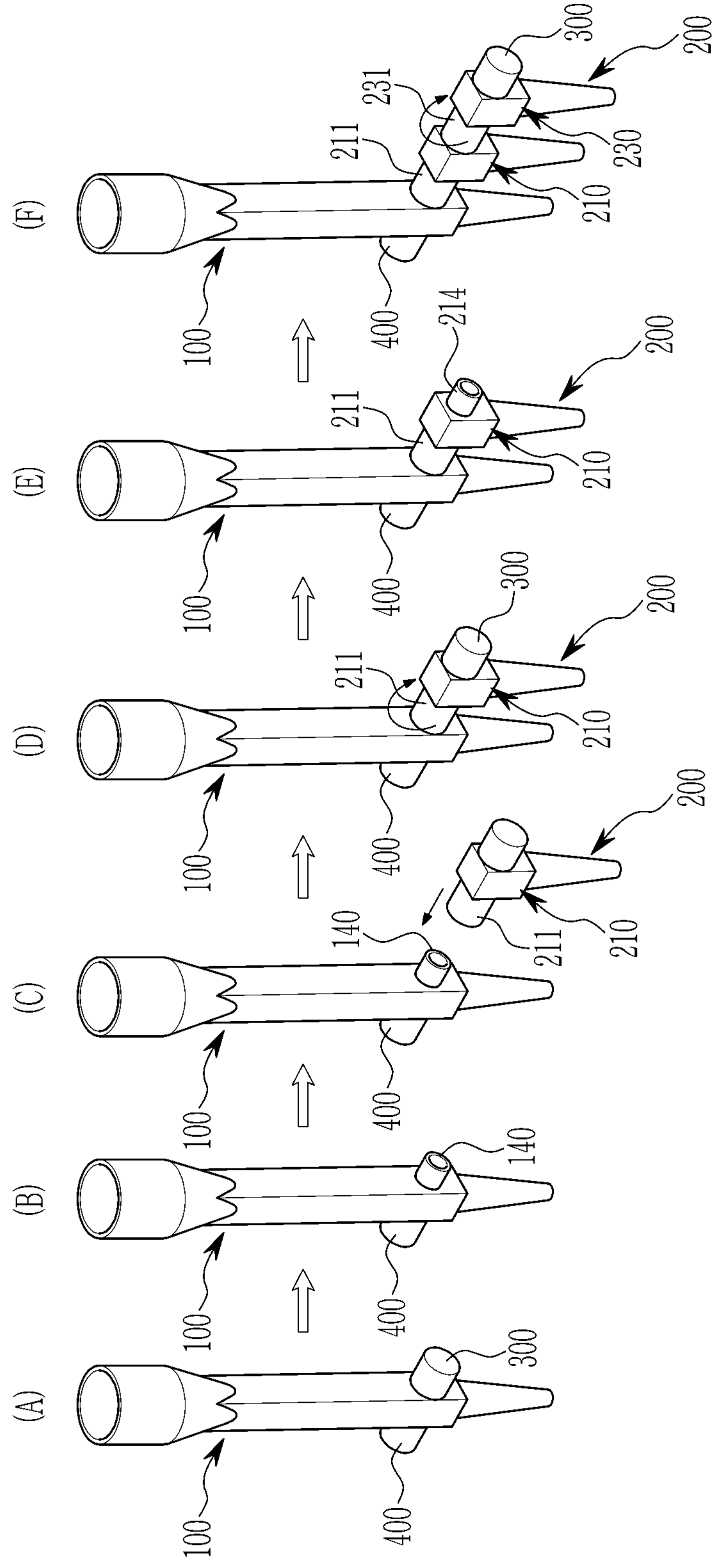
FIG. 4 shows a coupling portion of the injection nozzle according to an embodiment.

FIG. 2 is a perspective view of the injection nozzle according to an embodiment. FIG. 3 is a cross-sectional view along III-III of FIG. 2. FIG. 4 shows a coupling portion of the injection nozzle according to an embodiment.

Referring to FIG. 2 and FIG. 3, the main nozzle 100 may include an inflow hole 110, an injection hole 120, a main nozzle body 130, a first main coupling portion 140, and a second main coupling portion 150.

The inflow hole 110 may be on the main nozzle 100 and may be configured to receive a thermal interface material supplied from the outside (e.g., from a thermal interface material supply). In an implementation, the inflow hole 110 may be connected to various suitable nozzle movers, e.g., a pipe or a robot arm, and may receive a thermal interface material from the nozzle mover. In an implementation, the inflow hole 110 may have a circular shape, or other suitable shapes.

The injection hole 120 may be at a lower portion of the main nozzle 100, and the thermal interface material supplied to the inflow hole 110 may be injected to the surface 11 of the rechargeable battery housing 10 (e.g., through the injection hole 120). The thermal interface material may be injected through the main nozzle 100 from the supply, through the injection hole 120, and onto the surface 11 of the rechargeable battery housing 10.

The main nozzle body 130 may be in fluid communication with the inflow hole 110 and the injection hole 120 and between the inflow hole 110 and the injection hole 120. The thermal interface material supplied to the inflow hole 110 may pass through the main nozzle body 130 and to the injection hole 120. In an implementation, in the main nozzle 100, a width in the lateral direction LD of an internal space may narrow as it goes from the inflow hole 110 through the main nozzle body 130 to the injection hole 120. As a result, injection speed of the thermal interface material injected to the surface 11 of the rechargeable battery housing through the injection hole 120 may be improved.

A first main coupling portion 140 may protrude from a first portion of the main nozzle body 130 in the lateral direction LD and may be coupled with the first sub nozzle 210 adjacent to the plurality of sub nozzles 200. The first main coupling portion 140 may have a circular shape. In an implementation, a screw thread may be on an outer surface of the first main coupling portion 140. The first main coupling portion 140 may be inserted into a first sub coupling portion 211 of the first sub nozzle 210. In an implementation, the first main coupling portion 140 may be screwed into the first sub coupling portion 211 (e.g., to be screw-coupled thereto). The thermal interface material passing through the main nozzle body 130 may move into the first sub nozzle 210 through the first main coupling portion 140. In an implementation, the first main coupling portion 140 may be inserted into the first sub coupling portion 211 of the first sub nozzle 210 and screw-coupled with the first sub coupling portion 211 such that a leakage of the thermal interface material (moving from the main nozzle body 130 into the first sub nozzle 210) to the outside through a space between the first main coupling portion 140 and the first sub coupling portion 211 may be suppressed or prevented.

The second main coupling portion 150 may protrude in the lateral direction LD from a second portion of the main nozzle body 130, which is on the opposite side of the first portion of the main nozzle body 130 in the lateral direction LD. In an implementation, the second main coupling portion 150 may be coupled with an adjacent second sub nozzle 220 of the plurality of sub nozzles 200. The second main coupling portion 150 may have a circular shape. In an implementation, a screw thread may be on an outer surface of the second main coupling portion 150. The second main coupling portion 150 may be inserted into the second sub coupling portion 221 of the second sub nozzle 220. In an implementation, the second main coupling portion 150 may be screw coupled with the second sub coupling portion 221. The thermal interface material passing through the main nozzle body 130 may move into the second sub nozzle 220 through the second main coupling portion 150. In an implementation, the second main coupling portion 150 may be inserted into the second sub coupling portion 221 of the second sub nozzle 220 and screw-coupled with the second sub coupling portion 221 such that a leakage of the thermal interface material (moving from the main nozzle body 130 to the second sub nozzle 220) to the outside through the gap between the second main coupling portion 150 and the second sub coupling portion 221 may be suppressed or prevented.

The first sub nozzle 210 may be coupled with the first main coupling portion 140 of the main nozzle 100 in the lateral direction LD, may be configured to receive the thermal interface material from the main nozzle 100, and may be configured to inject the thermal interface material onto the surface of the rechargeable battery housing. The first sub nozzle 210 may include a first sub coupling portion 211, a first sub injection hole 212, a first sub nozzle body 213, and a first extension coupling portion 214.

The first sub coupling portion 211 may be coupled with the first main coupling portion 140 and may be configured to receive the thermal interface material from the main nozzle body 130. The first sub coupling portion 211 may have a circular shape. In an implementation, a screw thread complementary to the first main coupling portion 140 may be on an inner surface of the first sub coupling portion 211. The first sub coupling portion 211 may cover the first main coupling portion 140 of the main nozzle 100 inserted therein and may be screw coupled with the first main coupling portion 140. The thermal interface material passing through the main nozzle body 130 may move to the first sub nozzle 210 through the first sub coupling portion 211, and the first sub coupling portion 211 may cover the first main coupling portion 140 of the main nozzle 100 inserted therein and may be screwed together with the first main coupling portion 140 such that a leakage of the thermal interface material moving from the main nozzle body 130 to the first sub nozzle 210 to the outside through a space between the first main coupling portion 140 and the first sub coupling portion 211 may be suppressed or prevented.

The first sub injection hole 212 may be below the first sub nozzle 210 and may be configured to inject the thermal interface material from the first sub coupling portion 211 onto the surface of the rechargeable battery housing. The thermal interface material may be supplied from the main nozzle 100 through the first sub injection hole 212 to the surface of the rechargeable battery housing through the first sub nozzle 210.

The first sub nozzle body 213 may be in fluid communication with the first sub coupling portion 211 and the first sub injection hole 212 and between the first sub coupling portion 211 and the first sub injection hole 212. The thermal interface material supplied to the first sub coupling portion 211 through the first sub nozzle body 213 may move to the first sub injection hole 212. A width of an inner space (in the lateral direction LD) of the first sub nozzle 210 may narrow as it goes from the first sub coupling portion 211 through the first sub nozzle body 213 to the first sub injection hole 212. In an implementation, a spray speed of the thermal interface material to the surface of the rechargeable battery housing through the first sub injection hole 212 may be improved.

The first extension coupling portion 214 may protrude in the lateral direction LD from a portion of the first sub nozzle body 213 on the opposite side of the first sub coupling portion 211 (in the lateral direction LD), and may be coupled with an adjacent third sub nozzle 230 of the plurality of sub nozzles 200. The first extension coupling portion 214 may have a circular shape. In an implementation, a screw thread may be on the outer surface of the first extension coupling portion 214. The first extension coupling portion 214 may be inserted into the third sub coupling portion 231 of the third sub nozzle 230. In an implementation, the first extension coupling portion 214 may be screw-coupled with the third sub coupling portion 231. The thermal interface material passing through the first sub nozzle body 213 may move to the third sub nozzle 230 through the first extension coupling portion 214. In an implementation, the first extension coupling portion 214 may be inserted into the third sub coupling portion 231 of the third sub nozzle 230 and screw-coupled with the third sub coupling portion 231 such that a leakage of the thermal interface material (moving from the first sub nozzle body 213 to the third sub nozzle 230) to the outside through a space between the first extension coupling portion 214 and the third sub coupling portion 231 may be suppressed or prevented.

The second sub nozzle 220 may be coupled with the second main coupling portion 150 of the main nozzle 100 in the lateral direction LD, may be configured to receive the thermal interface material from the main nozzle 100, and may be configured to inject the thermal interface material onto the surface of the rechargeable battery housing. The second sub nozzle 220 may include a second sub coupling portion 221, a second sub injection hole 222, a second sub nozzle body 223, and a second extension coupling portion 224.

The second sub coupling portion 221 may be coupled with the second main coupling portion 150 and may be configured to receive the thermal interface material from the main nozzle body 130. The second sub coupling portion 221 may have a circular shape. In an implementation, a screw-thread complementary to the second main coupling portion 150 may be on an inner surface of the second sub coupling portion 221. The second sub coupling portion 221 may cover the second main coupling portion 150 of the main nozzle 100 inserted therein and may be screw-coupled with the second main coupling portion 150. The thermal interface material passing through the main nozzle body 130 may move to the second sub nozzle 220 through the second sub coupling portion 221, and the second sub coupling portion 221 may cover the second main coupling portion 150 of the main nozzle 100 inserted therein and may be screw-coupled with the second main coupling portion 150 such that a leakage of the thermal interface material (moving from the main nozzle body 130 to the second sub nozzle 220) to the outside through a space between the second main coupling portion 150 and the second sub coupling portion 221 may be suppressed or prevented.

The second sub injection hole 222 may be below the second sub nozzle 220 and may be configured to inject the thermal interface material received from the second sub coupling portion 221 to the surface of the rechargeable battery housing. The thermal interface material may be injected from the main nozzle 100 through the second sub nozzle 220 to the surface of the rechargeable battery housing through the second sub injection hole 222.

The second sub nozzle body 223 may be in fluid communication with the second sub coupling portion 221 and the second sub injection hole 222 and between the second sub coupling portion 221 and the second sub injection hole 222. The thermal interface material may be supplied to the second sub coupling portion 221 through the second sub nozzle body 223 and my move to the second sub injection hole 222. A width of an inner space of the second sub nozzle 220 in the lateral direction LD may narrow as it goes from the second sub coupling portion 221 through the second sub nozzle body 223 to the second sub injection hole 222. In an implementation, the spraying speed of the thermal interface material sprayed to the surface of the rechargeable battery housing through the second sub injection hole 222 may be improved.

The second extension coupling portion 224 may protrude in the lateral direction LD from a portion of the second sub nozzle body 223 on the opposite side of the second sub coupling portion 221 (in the lateral direction LD), and may be coupled with an adjacent fourth sub nozzle 240 of the plurality of sub nozzles 200. The second extension coupling portion 224 may have a circular shape. In an implementation, a screw thread may be on an outer surface of the second extension coupling portion 224. The second extension coupling portion 224 may be inserted into the fourth sub coupling portion 241 of the fourth sub nozzle 240, and the second extension coupling portion 224 may be screw-coupled with the fourth sub coupling portion 241. The thermal interface material from the second sub nozzle body 223 may move to the fourth sub nozzle 240 through the second extension coupling portion 224. In an implementation, the second extension coupling portion 224 may be inserted into the fourth sub coupling portion 241 of the fourth sub nozzle 240 and may be screw-coupled with the fourth sub coupling portion 241 such that a leakage of the thermal interface material (moving from the second sub nozzle body 223 to the fourth sub nozzle 240) to the outside through a space between the second extension coupling portion 224 and the fourth sub coupling portion 241 may be suppressed or prevented.

The third sub nozzle 230 may be coupled with the first extension coupling portion 214 of the first sub nozzle 210 in the lateral direction LD, may be configured to receive the thermal interface material from the first sub nozzle 210, and may be configured to spray the thermal interface material onto the surface of the rechargeable battery housing. The third sub nozzle 230 may include a third sub coupling portion 231, a third sub injection hole 232, a third sub nozzle body 233, and a third extension coupling portion 234.

The third sub coupling portion 231 may be coupled with the first extension coupling portion 214 and may be configured to receive the thermal interface material from the first sub nozzle body 213. The third sub coupling portion 231 may have a circular shape. In an implementation, a screw thread (complementary to that of the first extension coupling portion 214) may be on an inner surface of the third sub coupling portion 231. The third sub coupling portion 231 may cover the first extension coupling portion 214 of the first sub nozzle 210 inserted therein and may be screw-coupled with the first extension coupling portion 214. The thermal interface material passing through the first sub nozzle body 213 may move to the third sub nozzle 230 through the third sub coupling portion 231. In an implementation, the third sub coupling portion 231 may cover the first extension coupling portion 214 of the first sub nozzle 210 inserted therein and may be screw-coupled with the first extension coupling portion 214 such that a leakage of the thermal interface material (moving from the first sub nozzle body 213 to the third sub nozzle 230(to the outside through a space between the first extension coupling portion 214 and the third sub coupling portion 231 may be suppressed or prevented.

The third sub injection hole 232 may be below the third sub nozzle 230, and the thermal interface material supplied to the third sub coupling portion 231 may be injected onto the surface of the rechargeable battery housing. The thermal interface material may pass through the first sub nozzle 210 to the third sub injection hole 232 and through the third sub nozzle 230 to the rechargeable battery housing surface.

The third sub nozzle body 233 may be in fluid communication with the third sub coupling portion 231 and the third sub injection hole 232 and between the third sub coupling portion 231 and the third sub injection hole 232. The thermal interface material supplied to the third sub coupling portion 231 and through the third sub nozzle body 233 may move to the third sub injection hole 232. A width of the internal space of the third sub nozzle 230 in the lateral direction LD may narrow as it goes from the third sub coupling portion 231 through the third sub nozzle body 233 to the third sub injection hole 232. In an implementation, the spraying speed of the thermal interface material sprayed to the surface of the rechargeable battery housing through the third sub injection hole 232 may be improved.

The third extension coupling portion 234 may protrude in the lateral direction LD from a portion of the third sub nozzle body 233 on the opposite side of the third sub coupling portion 231 in the lateral direction LD, and may be coupled with the first nozzle cap 300. The third extension coupling portion 234 may have a circular shape. In an implementation, a screw thread may be on an outer surface of the third extension coupling portion 234. The third extension coupling portion 234 may be inserted into the first nozzle cap 300, and the third extension coupling portion 234 may be screw-coupled with the first nozzle cap 300. The third extension coupling portion 234 may be inserted into the first nozzle cap 300 and screw-coupled with the first nozzle cap 300, and thus a leakage of the thermal interface material (passing through the third sub nozzle body 233) to the outside through a space between the third extension coupling portion 234 and the first nozzle cap 300 may be suppressed or prevented. In an implementation, another sub nozzle may be coupled with the third extension coupling portion 234 (e.g., depending on a size and/or shape of the surface of the rechargeable battery housing.

The fourth sub nozzle 240 may be coupled with the second extension coupling portion 224 of the second sub nozzle 220 in the lateral direction LD, may be configured to receive the thermal interface material from the second sub nozzle 220, and may be configured to spray the thermal interface material onto the surface of the rechargeable battery housing. The fourth sub nozzle 240 may include a fourth sub coupling portion 241, a fourth sub injection hole 242, a fourth sub nozzle body 243, and a fourth extension coupling portion 244.

The fourth sub coupling portion 241 may be coupled with the second extension coupling portion 224 and may be configured to receive the thermal interface material from the second sub nozzle body 223. The fourth sub coupling portion 241 may have a circular shape. In an implementation, a screw thread complementary to that of the second extension coupling portion 224 may be on an inner surface of the fourth sub coupling portion 241. The fourth sub coupling portion 241 may cover the second extension coupling portion 224 of the second sub nozzle 220 inserted therein and may be screw-coupled with the second extension coupling portion 224. The thermal interface material may pass through the second sub nozzle body 223 and may move into the fourth sub nozzle 240 through the fourth sub coupling portion 241. The fourth sub coupling portion 241 may cover the second extension coupling portion 224 of the second sub nozzle 220 inserted therein and may be screw-coupled with the second extension coupling portion 224 such that a leakage of the thermal interface material (moving from the second sub nozzle body 223 to the fourth sub nozzle 240) to the outside through a space between the second extension coupling portion 224 and the fourth sub coupling portion 241 may be suppressed or prevented.

The fourth sub injection hole 242 may be below the fourth sub nozzle 240 and may be configured to inject the thermal interface material from the fourth sub coupling portion 241 onto the surface of the rechargeable battery housing. The thermal interface material may move from the second sub nozzle 220 to the fourth sub injection hole 242 through the fourth sub nozzle 240 and then onto the surface of the rechargeable battery housing.

The fourth sub nozzle body 243 may be in fluid communication with the fourth sub coupling portion 241 and the fourth sub injection hole 242 and between the fourth sub coupling portion 241 and the fourth sub injection hole 242. The thermal interface material may move from the fourth sub coupling portion 241 through the fourth sub nozzle body 243 and to the fourth sub injection hole 242. A width of an inner space of the fourth sub nozzle 240 in the lateral direction LD may narrow as it goes from the fourth sub coupling portion 241 through the fourth sub nozzle body 243 to the fourth sub injection hole 242. In an implementation, the spraying speed of the thermal interface material sprayed to the surface of the rechargeable battery housing through the fourth sub injection hole 242 may be improved.

The fourth extension coupling portion 244 may protrude in the lateral direction LD from a portion of the fourth sub nozzle body 243 on the opposite side of the fourth sub coupling portion 241 (in the lateral direction LD) and may be coupled with the third nozzle cap 400. The fourth extension coupling portion 244 may have a circular shape. In an implementation, a screw-thread may be on an outer surface of the fourth extension coupling portion 244. The fourth extension coupling portion 244 may be inserted into the third nozzle cap 400, and the fourth extension coupling portion 244 may be screw-coupled with the third nozzle cap 400. The fourth extension coupling portion 244 may be inserted into the third nozzle cap 400 and screw-coupled with the third nozzle cap 400, and a leakage of the thermal interface material (passing through the fourth sub nozzle body 243) to the outside through a space between the fourth extension coupling portion 244 and the third nozzle cap 400 may be suppressed or prevented. In an implementation, another sub nozzle may be coupled to the fourth extension coupling portion 244.

The first nozzle cap 300 may be coupled with the third extension coupling portion 234 of the third sub nozzle 230. The first nozzle cap 300 may be screw-coupled with the third extension coupling portion 234 inserted therein. The first nozzle cap 300 may be screw-coupled with the third extension coupling portion 234 inserted into the inside, and a leakage of the thermal interface material (passing through the third sub nozzle body 233) to the outside through a space between the third extension coupling portion 234 and the first nozzle cap 300 may be suppressed or prevented.

The third nozzle cap 400 may be coupled with the fourth extension coupling part 244 of the fourth sub nozzle 240. The third nozzle cap 400 may be screw-coupled with the fourth extension coupling portion 244 inserted therein. The third nozzle cap 400 may be screw-coupled with the inserted fourth extension coupling portion 244, and a leakage of the thermal interface material (passing through the fourth sub nozzle body 243) to the outside through a space between the fourth extension coupling portion 244 and the third nozzle cap 400 may be suppressed or prevented.

Hereinafter, referring to FIG. 4, an example of coupling the plurality of sub nozzles 200 of the injection nozzle 1000 according to an embodiment will be described.

FIG. 4 is a perspective view that shows coupling of a plurality of sub nozzles of an injection nozzle according to an embodiment.

Referring to part (A) of FIG. 4, the first nozzle cap 300 and the third nozzle cap 400 may be coupled with each of the first main coupling portion and the second main coupling portion of the main nozzle 100, and thus the thermal interface material may be sprayed using the main nozzle 100.

Referring to part (B) of FIG. 4, the first nozzle cap 300 may be separated from the first main coupling portion 140 of the main nozzle 100, referring to part (C) of FIG. 4, the first main coupling portion 140 of the main nozzle 100 is inserted into the first sub coupling portion 211 of the first sub nozzle 210 (to which the first nozzle cap 300 is coupled to the first extension coupling portion), and referring to part (D) of FIG. 4, the first sub nozzle 210 may be rotated to screw-couple the first sub coupling portion 211 of the first sub nozzle 210 into the first main coupling portion 140 of the main nozzle 100 such that the thermal interface material may be sprayed by using the main nozzle 100 and the first sub nozzle 210.

Referring to part(E) of FIG. 4, the first nozzle cap 300 is separated from the first extension coupling portion 214 of the first sub nozzle 210, and referring to part (F) of FIG. 4, the first extension coupling portion 214 of the first sub nozzle 210 may be inserted into the third sub coupling portion 231 of the third sub nozzle 230 (to which the first nozzle cap 300 is coupled to the third extension coupling portion), and the third sub nozzle 230 may be rotated to screw-couple the third sub coupling portion 231 of the third sub nozzle 230 to the first extension coupling portion 214 of the first sub nozzle 210 such that the thermal interface material may be sprayed using the main nozzle 100, the first sub nozzle 210, and the second sub nozzle 220.

Hereinafter, examples of the injection nozzle 1000 according to an embodiment will be described.

Figure 5:
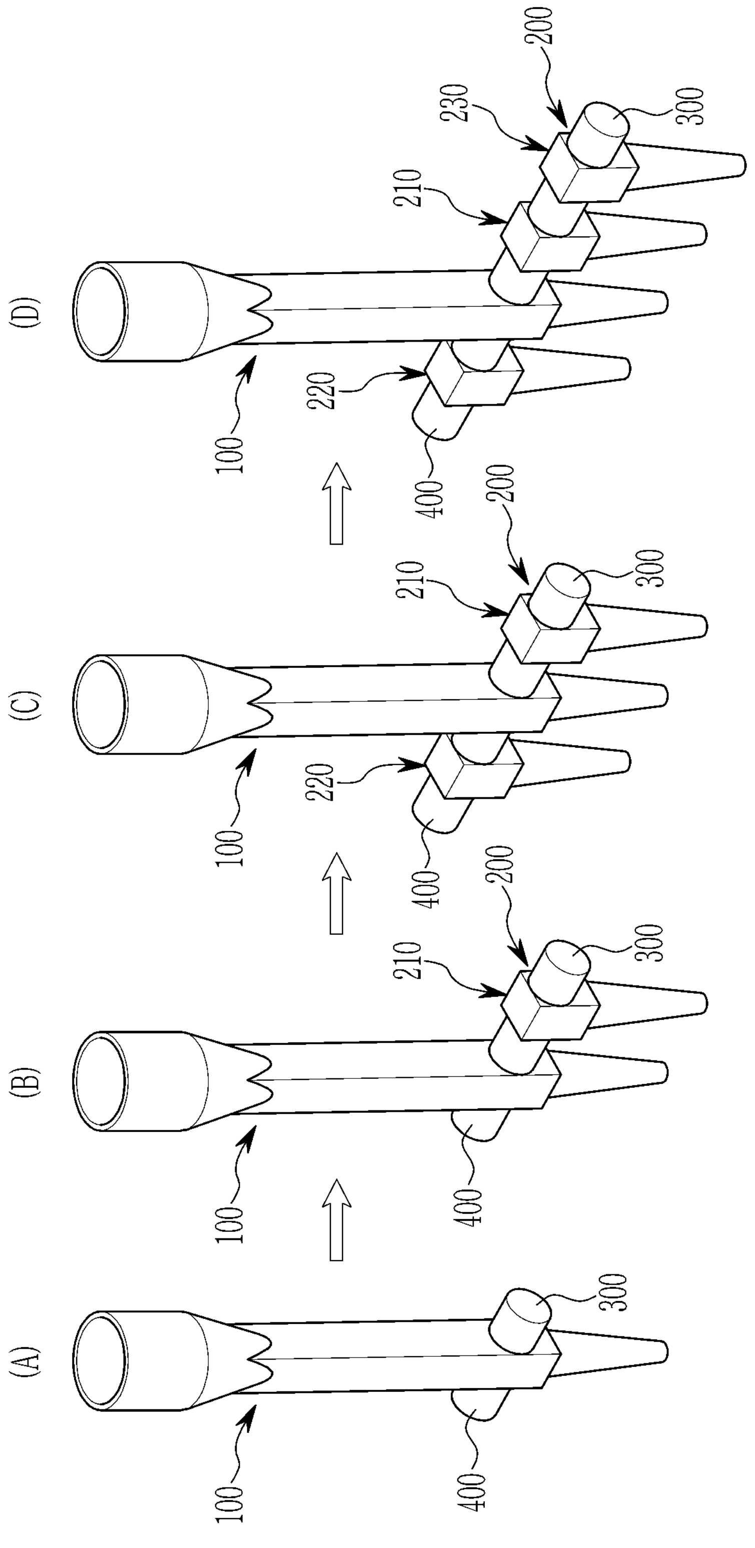
FIG. 5 is a perspective view of examples of the injection nozzle according to an embodiment.

FIG. 5 is a perspective view of examples of the injection nozzle according to an embodiment.

Referring to part (A) of FIG. 5, a thermal interface material may be sprayed using an injection nozzle that includes a main nozzle 100 in which a first nozzle cap 300 and a third nozzle cap 400 are respectively coupled to each of a first main coupling portion and a second main coupling portion of the main nozzle 100 corresponding to one width of the surface of the rechargeable battery housing.

Referring to part (B) of FIG. 5, a thermal interface material may be sprayed using an injection nozzle that includes a main nozzle 100 in which a first sub nozzle 210 and a third nozzle cap 400 are respectively coupled to each of a first main coupling portion and a second main coupling portion of the main nozzle 100, and a first sub nozzle 210 corresponding to another width of the surface of the rechargeable battery housing.

Referring to part (C) of FIG. 5, a thermal interface material may be injected using an injection nozzle that includes a main nozzle 100 in which a first sub nozzle 210 and a second sub nozzle 220 are respectively coupled to each of the first main coupling portion and the second main coupling portion of the main nozzle 100, and the first sub nozzle 210, and the second sub nozzle 220 corresponding to another width of the surface of the rechargeable battery housing.

Referring to part (D) of FIG. 5, a thermal interface material may be injected using an injection nozzle that includes a main nozzle 100 that includes a main nozzle 100 in which a first sub nozzle 210 and a second sub nozzle 220 are respectively coupled to the first main coupling portion and the second main coupling portion, and a third sub nozzle 230 is coupled to the first sub nozzle 210, the second sub nozzle 220, and the third sub nozzle 230.

As described above, in the injection nozzle 1000 according to an embodiment, the plurality of sub nozzles 200 including the first sub nozzle 210, the second sub nozzle 220, the third sub nozzle 230, and the fourth sub nozzle 240 may be selectively coupled with the main nozzle 100 in a number corresponding to the width WI of the surface 11 of the rechargeable battery housing 10 and thus the main nozzle 100 and the plurality of sub nozzles 200 may simultaneously spray the thermal interface material 20 on the surface 11 of the rechargeable battery housing 10, thereby minimizing the process time and process cost of spraying the thermal interface material 20 on the surface 11 of the rechargeable battery housing 10.

The injection nozzle 1000 according to the embodiment may help reduce the thermal interface material injection process time for the rechargeable battery housing 10, thereby simplifying the thermal interface material injection process and the logic of the nozzle mover accordingly. Thus, the number of injection reciprocations and injection reciprocations of the nozzle mover pattern can be minimized. In an implementation, the entire amount of working amount and working time of the nozzle mover such as a robot arm that moves the injection nozzle 1000 may be shortened, the entire battery module and pack manufacturing time may be shortened, and productivity may be improved.

In an implementation, the injection nozzle 1000 that easily injects the thermal interface material 20 corresponding to the width WI of the surface 11 of the various rechargeable battery housings 10 having various surface areas may be provided.

By way of summation and review, some rechargeable battery housings perform cooling by contacting a heat exchange material including cooling water or the like, and a thermal interface material (TIM) may be sprayed on the surface of the rechargeable battery housing to help improve heat conduction performance.

The rechargeable battery housing may have various surface areas depending on the shape and size of the rechargeable battery, and thus it could be difficult to spray the thermal interface material on the surface of various rechargeable battery housings having various surface areas using the same injection nozzle.

One or more embodiments may provide an injection nozzle through which it may be easy to inject a heat exchange material onto the surface of various rechargeable battery housings having various surface areas or shapes.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An injection nozzle configured to spray a material to a surface of a rechargeable battery housing, the injection nozzle comprising:

a main nozzle that is configured to receive the material from a source and spray the material to the surface of the rechargeable battery housing;

a plurality of sub nozzles that are coupled to the main nozzle in a lateral direction, the plurality of sub nozzles being configured to receive the material from the main nozzle and spray the material to the surface of the rechargeable battery housing, wherein the main nozzle includes:

an inflow hole that is configured to receive the material from the source, an injection hole that is configured to spray the material supplied through the inflow hole to the surface of the rechargeable battery housing, and a main nozzle body that is in fluid communication with and between the inflow hole and the injection hole, and wherein a width of an inner space of the main nozzle in the lateral direction is reduced from the inflow hole through the main nozzle body to the injection hole.

2. The injection nozzle as claimed in claim 1, wherein a number of the plurality of sub nozzles corresponds to a width of the surface of the rechargeable battery housing along the lateral direction.

3. The injection nozzle as claimed in claim 1, wherein the main nozzle further includes:

a first main coupling portion protruding in the lateral direction from a first portion of the main nozzle body and coupled with an adjacent first sub nozzle of the plurality of sub nozzles; and a second main coupling portion protruding in the lateral direction from a second portion of the main nozzle body on an opposite side of the first portion in the lateral direction and coupled with an adjacent second sub nozzle of the plurality of sub nozzles.

4. The injection nozzle as claimed in claim 3, wherein the first sub nozzle includes:

a first sub coupling portion that is coupled with the first main coupling portion and is configured to receive the material from the main nozzle body;

a first sub injection hole that is configured to spray the material received from the first sub coupling portion to the surface of the rechargeable battery housing; and a first sub nozzle body that is in fluid communication with and between the first sub coupling portion and the first sub injection hole.

5. The injection nozzle as claimed in claim 4, wherein the first main coupling portion is inserted into the first sub coupling portion.

6. The injection nozzle as claimed in claim 5, wherein the first main coupling portion is screw-coupled with the first sub coupling portion.

7. The injection nozzle as claimed in claim 4, wherein the first sub nozzle further includes a first extension coupling portion that protrudes in the lateral direction from a portion of the first sub nozzle body on an opposite side of the first sub coupling portion in the lateral direction and is coupled with an adjacent third sub nozzle of the plurality of sub nozzles.

8. The injection nozzle as claimed in claim 7, wherein the third sub nozzle includes:

a third sub coupling portion that is coupled with the first extension coupling portion and is configured to receive the material from the first sub nozzle body;

a third sub injection hole that is configured to spray the material received from the third sub coupling portion to the surface of the rechargeable battery housing; and a third sub nozzle body that is in fluid communication with and between the third sub coupling portion and the third sub injection hole.

9. The injection nozzle as claimed in claim 8, wherein the first extension coupling portion is inserted into the third sub coupling portion.

10. The injection nozzle as claimed in claim 9, wherein the first extension coupling portion is screw-coupled with the third sub coupling portion.

11. The injection nozzle as claimed in claim 8, wherein:

the third sub nozzle further includes a third extension coupling portion that protrudes in the lateral direction from a portion of the third sub nozzle body on the opposite side of the third sub coupling portion in the lateral direction, and the injection nozzle further comprises a first nozzle cap coupled to the third extension coupling portion.

12. The injection nozzle as claimed in claim 3, wherein the second sub nozzle includes:

a second sub coupling portion that is coupled with the second main coupling portion and is configured to receive the material from the main nozzle body;

a second sub injection hole configured to spray the material received from the second sub coupling portion to the surface of the rechargeable battery housing; and a second sub nozzle body that is in fluid communication with and between the second sub coupling portion and the second sub injection hole.

13. The injection nozzle as claimed in claim 12, wherein the second main coupling portion is inserted into the second sub coupling portion.

14. The injection nozzle as claimed in claim 13, wherein the second main coupling portion is screw-coupled with the second sub coupling portion.

15. The injection nozzle as claimed in claim 12, wherein the second sub nozzle further includes a second extension coupling portion that protrudes in the lateral direction from a portion of the second sub nozzle body on an opposite side of the second sub coupling portion in the lateral direction and is coupled with an adjacent fourth sub nozzle of the plurality of sub nozzles.

16. The injection nozzle as claimed in claim 15, wherein the fourth sub nozzle includes:

a fourth sub coupling portion that is coupled to the second extension coupling portion and is configured to receive the material from the second sub nozzle body;

a fourth sub injection hole that is configured to spray the material received from the fourth sub coupling portion to the surface of the rechargeable battery housing; and a fourth sub nozzle body that is in fluid communication with and between the fourth sub coupling portion and the fourth sub injection hole.

17. The injection nozzle as claimed in claim 16, wherein:

the second extension coupling portion is inserted into the fourth sub coupling portion, and the second extension coupling portion is screw-coupled with the fourth sub coupling portion.

18. The injection nozzle as claimed in claim 16, wherein:

the fourth sub nozzle further includes a fourth extension coupling portion that protrudes in the lateral direction from a portion of the fourth sub nozzle body on the opposite side of the fourth sub coupling portion in the lateral direction, and the injection nozzle further comprises a second nozzle cap coupled with the fourth extension coupling portion.

* * * * *